US012670366B2

(12) United States Patent
Rhe et al.

(10) Patent No.: US 12,670,366 B2
(45) Date of Patent: Jun. 30, 2026

(54) MEMORY DEVICE FOR OPTIMIZING COMPUTATION OF CONVOLUTION LAYER, METHOD FOR CONTROLLING MEMORY DEVICE, AND RECORDING MEDIUM STORING INSTRUCTION TO PERFORM METHOD FOR CONTROLLING MEMORY DEVICE

(71) Applicant: Research & Business Foundation SUNGKYUNKWAN UNIVERSITY, Suwon-si (KR)

(72) Inventors: Johnny Rhe, Suwon-si (KR); Sung Min Moon, Suwon-si (KR); Jong Hwan Ko, Suwon-si (KR)

(73) Assignee: Research & Business Foundation SUNGKYUNKWAN UNIVERSITY, Suwon-si (KR)

( * ) Notice: Subject to any disclaimer, the term of this patent is extended or adjusted under 35 U.S.C. 154(b) by 819 days.

(21) Appl. No.: 18/090,628

(22) Filed: Dec. 29, 2022

(65) Prior Publication Data

US 2023/0206033 A1     Jun. 29, 2023

(30) Foreign Application Priority Data

Dec. 29, 2021     (KR) ........................ 10-2021-0191289

(51) Int. Cl.
*G06N 3/0464*     (2023.01)
(52) U.S. Cl.
CPC .................................. *G06N 3/0464* (2023.01)

(58) Field of Classification Search
CPC ...................................................... G06N 3/0464
See application file for complete search history.

(56) References Cited

U.S. PATENT DOCUMENTS

| | | | | |
|---|---|---|---|---|
| 2018/0129893 A1* | 5/2018 | Son | ...................... | G06N 3/0464 |
| 2019/0138567 A1* | 5/2019 | Martin | ................. | G06N 3/0464 |
| 2020/0050555 A1 | 2/2020 | Kim et al. | | |
| 2021/0124588 A1* | 4/2021 | Rakshit | ................. | G06F 9/3867 |
| 2021/0124984 A1* | 4/2021 | Rakshit | .................. | G06F 18/21 |
| 2021/0279586 A1* | 9/2021 | He | ........................... | G06F 18/22 |
| 2021/0287075 A1 | 9/2021 | Verheyen et al. | | |
| 2022/0012303 A1* | 1/2022 | Zheng | ................... | G06N 3/063 |
| 2023/0008622 A1* | 1/2023 | Boyd | .................... | G06F 7/5443 |
| 2023/0206033 A1* | 6/2023 | Rhe | ........................ | G06N 3/063 |
| | | | | 706/22 |
| 2024/0152738 A1* | 5/2024 | Park | ......................... | G06N 3/08 |
| 2024/0202526 A1* | 6/2024 | Kim | ..................... | G06N 3/0464 |
| 2024/0232600 A1* | 7/2024 | Imber | .................... | G06N 3/063 |

OTHER PUBLICATIONS

Korean Office Action issued on Jan. 22, 2024, in counterpart Korean Patent Application No. 10-2021-0191289 (5 pages in English, 5 pages in Korean).

* cited by examiner

*Primary Examiner* — David E Choi

(57) ABSTRACT

There is a method of controlling a memory device. The method comprises acquiring a size of a PIM array provided to compute a convolution layer included in a deep neural network, a size of input data input to the convolution layer, and a size of a kernel filtering the input data; and determining a size of a parallel window such that a number of times of cycles of the PIM array for the convolution layer is minimized based on the size of the PIM array, the size of the input data, and the size of the kernel.

15 Claims, 7 Drawing Sheets

MEMORY DEVICE FOR OPTIMIZING COMPUTATION OF CONVOLUTION LAYER, METHOD FOR CONTROLLING MEMORY DEVICE, AND RECORDING MEDIUM STORING INSTRUCTION TO PERFORM METHOD FOR CONTROLLING MEMORY DEVICE

CROSS-REFERENCE TO RELATED APPLICATIONS

This application claims the benefit under 35 USC § 119(a) of Korean Patent Application No. 10-2021-0191289, filed on Dec. 29, 2021, at the Korean Intellectual Property Office, the entire disclosure of which is incorporated herein by reference for all purposes.

TECHNICAL FIELD

The present disclosure relates to a memory device for optimizing computation of a convolution layer and a method for controlling memory device, and more particularly, to a memory device for optimizing a number of times of cycles required for computation of a convolution layer and a control method thereof.

This work was supported by Institute of Information & communications Technology Planning & Evaluation (IITP) grant funded by Korea government (MSIT) [Project No.: IITP-2020-0-01821; Government department: Ministry of Science and ICT; R&D management 0 Agency: Institute of Information & communications Technology Planning & Evaluation; R&D project: Nurturing Innovative Talent in Information Communications, and Broadcasting Technics; Research Project Title: ICT Research and Education Foundation(Sungkyunkwan University); and Project period: 2021.01.01~2021.12.31], [Project No.: 2019-0-00421; Government department: Ministry of Science and ICT; R&D management Agency: Institute of Information & communications Technology Planning & Evaluation; R&D project: Nurturing Innovative Talent in Information Communications, and Broadcasting Technics; Research Project Title: Artificial Intelligence Graduate School Program (Sungkyunkwan University); and Project period: 2021.01.01~2021.12.31], [Project No.: IITP-2021-0-02052; Government department: Ministry of Science and ICT; R&D management Agency: Institute of Information & communications Technology Planning & Evaluation; R&D project: Nurturing Innovative Talent in Information Communications, and Broadcasting Technics; Research Project Title: Development for Artificial Intelligence System on a Chip for Smart Mobility; and Project period: 2021.01.01~2021.12.31], [Project No.: IITP-2021-0-02068; Government department: Ministry of Science and ICT; R&D management Agency: Institute of Information & communications Technology Planning & Evaluation; R&D project: Nurturing Innovative Talent in Information Communications, and Broadcasting Technics; Research Project Title: Artificial intelligence Innovation Hub R&D; and Project period: 2021.01.01~2021.12.31], and [Project No.: 2022R1F1A1074142; Government department: Ministry of Science and ICT; R&D management Agency: Institute of Information & communications Technology Planning & Evaluation; R&D project: Individual Basic Research (MSIT)(16211101501551200123430 1); Research Project Title: Co-optimization Simulation Framework for Efficient In-Memory Deep Learning Computation; and Project period: 2022.06.01~2023.05.31].

BACKGROUND

In the process of computing a deep neural network such as CNN (Convolutional Neural Network), when the size of a Processing-In-Memory (PIM) array is large or the size of a convolutional layer is small, the conventional PIM-based array does not use a part of the PIM array.

Accordingly, recently, a Shift and Duplicate Kernel (SDK) technique has been proposed to reuse input data by duplicating and rearranging weights of the same kernel. Specifically, the SDK technique inputs a parallel window, which is a set of windows, to the PIM array instead of inputting a window having the same size as the size of the kernel to the PIM array. Accordingly, by computing multiple output values from the PIM array per cycle, the total number of cycles of convolution computation may be reduced.

However, since the SDK technique performs all computations of a convolution layer using a fixed-size parallel window, it is difficult to use when the size of the PIM array is small or the size of the convolution layer is large.

SUMMARY

A technical task of the present disclosure is to provide a memory device for optimizing a number of time of cycles for computation of a convolution layer performed in a Processing-In-Memory (PIM) based memory device in consideration of the characteristics of the convolution layer and a control method thereof.

In accordance with an aspect of the present disclosure, there is provided a method for controlling a memory device. The method comprises acquiring a size of a PIM array provided to compute a convolution layer included in a deep neural network, a size of input data input to the convolution layer, and a size of a kernel filtering the input data; and determining a size of a parallel window such that a number of times of cycles of the PIM array for the convolution layer is minimized based on the size of the PIM array, the size of the input data, and the size of the kernel.

The determining the size of the parallel window may include calculating a number of times of shifts of the parallel window for the input data based on the size of the PIM array, the size of the input data, and the size of the kernel; calculating a number of times of inputs to the PIM array according to the size of the parallel window based on the size of the PIM array, the size of the input data, and the size of the kernel; calculating a number of times of outputs from the PIM array according to the size of the parallel window based on the size of the PIM array, the size of the input data, and the size of the kernel; and calculating a number of times of cycles based on at least one of the number of times of shifts, the number of times of inputs, and the number of times of outputs.

The calculating of the number of times of shifts may include calculating the number of times of shifts based on at least one of the size of the input data and the size of the kernel.

The calculating of the number of times of inputs may include calculating the number of times of inputs based on at least one of the size of the PIM array, the size of the input data, and the number of input channels according to the input data.

The calculating of the number of times of outputs may include calculating the number of times of outputs based on at least one of the size of the PIM array, the size of the input data, the size of the kernel, and the number of output channels according to the kernel.

In accordance with another aspect of the present disclosure, there is provided a memory device. The memory device comprises a PIM array configured to compute a convolution layer included in a deep neural network; and a controller configured to acquire a size of the PIM array, a size of input data input to the convolution layer, and a size of a kernel filtering the input data, and determine a size of a parallel window such that a number of times of cycles of the PIM array for the convolution layer is minimized based on the size of the PIM array, the size of the input data, and the size of the kernel.

The controller is configured to: calculate a number of times of shifts of the parallel window for the input data based on the size of the PIM array, the size of the input data, and the size of the kernel; calculate a number of times of inputs to the PIM array according to the size of the parallel window based on the size of the PIM array, the size of the input data, and the size of the kernel; calculate a number of times of outputs from the PIM array according to the size of the parallel window based on the size of the PIM array, the size of the input data, and the size of the kernel; and calculate a number of times of cycles based on at least one of the number of times of shifts, the number of times of inputs, and the number of times of outputs.

The controller is configured to calculate the number of times of shifts based on at least one of the size of the input data and the size of the kernel.

The controller is configured to calculate the number of times of inputs based on at least one of the size of the PIM array, the size of the input data, and the number of input channels according to the input data.

The controller is configured to calculate the number of times of outputs based on at least one of the size of the PIM array, the size of the input data, the size of the kernel, and the number of output channels according to the kernel.

In accordance with another aspect of the present disclosure, there is provided a non-transitory computer-readable storage medium including computer executable instructions, wherein the instructions, when executed by a processor, cause the processor to perform a method for controlling a memory device. The method comprises acquiring a size of a PIM array provided to compute a convolution layer included in a deep neural network, a size of input data input to the convolution layer, and a size of a kernel filtering the input data; and determining a size of a parallel window such that a number of times of cycles of the PIM array for the convolution layer is minimized based on the size of the PIM array, the size of the input data, and the size of the kernel The determining of the parallel window may include calculating a number of times of shifts of the parallel window for the input data based on the size of the PIM array, the size of the input data, and the size of the kernel; calculating a number of times of inputs to the PIM array according to the size of the parallel window based on the size of the PIM array, the size of the input data, and the size of the kernel; calculating a number of times of outputs from the PIM array according to the size of the parallel window based on the size of the PIM array, the size of the input data, and the size of the kernel; and calculating a number of times of cycles based on at least one of the number of times of shifts, the number of times of inputs, and the number of times of outputs.

The calculating of the number of times of shifts may include calculating the number of times of shifts based on at least one of the size of the input data and the size of the kernel.

The calculating of the number of times of inputs may include calculating the number of times of inputs based on at least one of the size of the PIM array, the size of the input data, and the number of input channels according to the input data.

The calculating of the number of times of outputs may include calculating the number of times of outputs based on at least one of the size of the PIM array, the size of the input data, the size of the kernel, and the number of output channels according to the kernel.

According to an aspect of the present disclosure described above, by providing the memory device for optimizing the computation of the convolution layer and the control method, the number of times of cycles for computation of a convolution layer performed in a PIM-based memory device can be optimized in consideration of the characteristics of the convolution layer.

DETAILED DESCRIPTION

Figure 1:
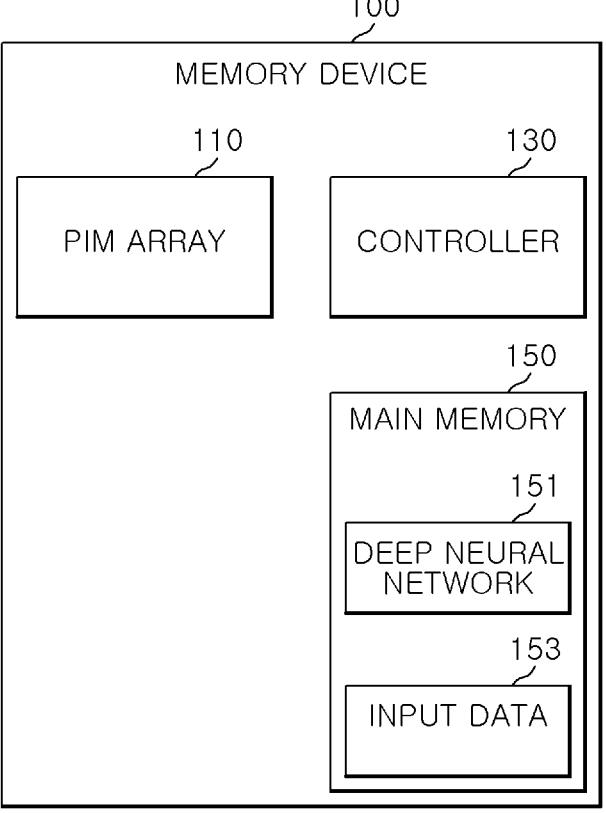
FIG. 1 is a block diagram of a memory device according to an embodiment of the present disclosure.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

FIG. 1 is a block diagram of a memory device according to an embodiment of the present disclosure.

Referring to FIG. 1, a memory device 100 may include a PIM array 110, a controller 130, and a main memory 150. In this connection, the memory device 100 may be a Processing-In-Memory device.

Accordingly, the PIM array 110 may be provided to compute a convolution layer included in a deep neural network 151. To this end, the PIM array 110 may include a plurality of sub-arrays arranged in a row direction and a column direction. In this connection, a weight according to a kernel may be set for each sub-array.

Herein, the kernel may be provided to filter input data 153. In addition, the input data 153 may be data input to the convolution layer.

Accordingly, the controller 130 inputs filtered values from the input data 153 to each row of the PIM array 110 and receives values computed through each sub-array from each column of the PIM array 110 as output.

In this connection, it may be understood that one cycle is performed in the PIM array 110 when the controller 130 inputs the filtered value to the PIM array 110 and receives the computed value as an output.

In an embodiment, the controller 130 may set a value input to the PIM array 110 through a voltage value and sense a value output from the PIM array 110 through a current value. In this connection, a weight according to a kernel may be set in each sub-array through a resistance value.

As such, the controller 130 may perform a computation on a convolution layer through the PIM array 110.

In this connection, the convolution layer may be included in a deep neural network such as a Convolution Neural Network (CNN). Accordingly, the number of channels for the input data 153, a kernel, and the number of output channels according to the kernel may be set in the convolution layer.

In this regard, the deep neural network 151 may include at least one convolutional layer. Accordingly, the controller 130 may perform a computation of each convolution layer.

In this regard, a process in which the controller 130 performs the computation of the convolution layer will be described in detail with reference to FIG. 2 below.

Meanwhile, the main memory 150 may store the deep neural network 151 and input data 153. Accordingly, the controller 130 may perform a computation of the convolution layer on the input data 153 based on the deep neural network 151.

In this connection, in an embodiment, the input data 153 may be an image, and thus, the input data 153 may be 2-dimensional or 3-dimensional matrix data.

In this process, the controller 130 may minimize a number of times of cycles of the PIM array 110 for the convolution layer based on the size of the PIM array 110, the size of the input data 153, and the size of the kernel.

To this end, the controller 130 may acquire the size of the PIM array 110, the size of the input data 153, and the size of the kernel.

Accordingly, the controller 130 may determine the size of a parallel window so that the number of times of cycles of the PIM array 110 for the convolution layer is minimized based on the size of the PIM array 110, the size of the input data 153, and the size of the kernel.

Herein, the parallel window may be set to indicate a range of values to be filtered from the input data 153. To this end, the parallel window may be set in the form of a 2-dimensional or 3-dimensional matrix. Accordingly, the controller 130 may input the filtered value to the PIM array 110 through the parallel window.

In this connection, each cycle in the PIM array 110 may be that the controller 130 inputs a filtered value to the PIM array 110 using the parallel window and receives the computed value from the PIM array 110 as an output.

In an embodiment, the size of the parallel window may be set equal to or greater than the kernel and equal to or smaller than the number of values inputtable to the PIM array 110.

Meanwhile, the controller 130 may calculate the number of times of cycles according to the size of the parallel window based on the size of the PIM array 110, the size of the input data 153, and the size of the kernel.

In an embodiment, the controller 130 may calculate the number of times of cycles according to the size of a plurality of different parallel windows based on the size of the PIM array 110, the size of the input data 153, and the size of the kernel, and may select the size of the parallel window at the smallest number of times of cycles among the calculated number of times of a plurality of cycles.

Herein, the sizes of the plurality of different parallel windows may mean the sizes of the plurality of parallel windows settable based on at least one of the size of the PIM array 110, the size of the input data 153, and the size of the kernel.

To this end, the controller 130 may calculate the number of times of shifts of the parallel window for the input data 153 based on the size of the PIM array 110, the size of the input data 153, and the size of the kernel.

Herein, the number of times of shifts may be the number of times of shifts of the parallel window required to complete the computation of the convolution layer on the input data 153. In other words, the number of times of shifts may be the number of times values are filtered from the input data 153 through the parallel window.

As such, the number of times of shifts may be calculated based on at least one of the size of the input data 153 and the size of the kernel.

In an embodiment, the controller 130 may calculate the number of times of shifts of the parallel window for the input data 153 through Equation 1 below.

$$N \text{ of } PWs = \qquad \text{[Equation 1]}$$
$$\left( \left\lceil \frac{I_W - PW_W}{PW_W - K_W + 1} \right\rceil + 1 \right) \times \left( \left\lceil \frac{I_H - PW_H}{PW_H - K_H + 1} \right\rceil + 1 \right)$$

In Equation 1, N of $PW_s$ may denote the number of times of shifts of the parallel window for the input data 153, and $\lceil \ \rceil$ may denote a Ceil function. In addition, $I_W$ may denote a widthwise size of the input data 153, $PW_W$ may denote a widthwise size of the parallel window, and $K_W$ may denote a widthwise size of the kernel. In addition, $I_H$ may denote a lengthwise size of the input data 153, $PW_H$ may denote a lengthwise size of the parallel window, and $K_H$ may denote a lengthwise size of the kernel. In this connection, 1 added to the size of the kernel may be a constant considering the stride of the kernel, and 1 added to the Ceil function may be a constant considering the stride of the parallel window.

Thus, the controller 130 may calculate the number of times of shifts in a horizontal direction and the number of times of shifts in a vertical direction, respectively, and may calculate the number of times of shifts of the parallel window for the input data 153 from the number of times of shifts in the horizontal and vertical directions.

The controller 130 may calculate the number of times of inputs to the PIM array 153 according to the size of the parallel window based on the size of the PIM array 110, the size of the input data 153, and the size of the kernel.

Herein, the number of times of inputs may be the number of times required to input the filtered value from the input data 153 to the PIM array 110 through the parallel window. In other words, the number of times of inputs may be the number of PIM arrays 110 required to input all filtered values to each row of the PIM array 110 based on the size of the parallel window and the number of input channels according to the input data 153.

As such, the number of times of inputs may be calculated based on at least one of the size of the PIM array 110, the size of the input data 153, and the number of input channels according to the input data 153.

In an embodiment, the controller 130 may calculate the number of times of inputs to the PIM array 110 through Equations 2 to 3 below.

$$IC_t = \left\lfloor \frac{2^X}{PW_W \times PW_H} \right\rfloor \qquad \text{[Equation 2]}$$

In Equation 2, $IC_t$ may denote a number of times a set of values filtered by the parallel window of a single depth (single channel) may be input to the PIM array 110, and $\lfloor \ \rfloor$ may be a Floor function. In addition, $2^X$ may denote the number of rows of the PIM array 110, $PW_W$ may denote a widthwise size of the parallel window, and $PW_H$ may denote a lengthwise size of the parallel window.

$$AR \text{ Cycles} = \left\lceil \frac{IC}{IC_t} \right\rceil \qquad \text{[Equation 3]}$$

8

In Equation 3, AR Cycles may denote the number of times of inputs which indicates the number of times required to input the filtered value from the input data 153 to the PIM array 110 and $\lceil \ \rceil$ may denote a Ceil function. In addition, IC may denote the number of input channels according to the input data 153, and $IC_t$ may denote the number of times the set of values filtered by the parallel window of the single depth (single channel) may be input to each row of the PIM array 110.

Thus, the controller 130 may calculate the number of times a set of values filtered by the parallel window of a single depth (single channel) may be input based on the number of rows of the PIM array 110. Thus, in the computation of the convolution layer, the number of times of inputs to the PIM array 110 according to the parallel window may be calculated.

The controller 130 may calculate the number of times of outputs from the PIM array 110 according to the size of the parallel window based on the size of the PIM array 110, the size of the input data 153, and the size of the kernel.

Herein, the number of times of outputs may be the number of times required to acquire an output for a value input to the PIM array 110 through the parallel window. In other words, the number of times of outputs may be the number of PIM arrays 110 required to acquire all output values from each column of the PIM array 110 based on the size of the parallel window and the number of kernels.

As such, the number of times of outputs may be calculated based on at least one of the size of the PIM array 110, the size of the input data 153, the size of the kernel, and the number of output channels according to the kernel.

In an embodiment, the controller 130 may calculate the number of times required for the PIM array in the column direction through Equations 4 to 5 below.

$$OC_t = \left\lfloor \frac{2^Y}{(PW_W - K_W + 1) \times (PW_H - K_H + 1)} \right\rfloor \qquad \text{[Equation 4]}$$

In Equation 4, $OC_t$ may denote a number of times a set of output values for the parallel window of a single depth (single channel) may be acquired from each column of the PIM array 110, and $\lfloor \ \rfloor$ may be a Floor function. In addition, $2^Y$ may denote the number of columns of the PIM array 110, $PW_W$ may denote a widthwise size of the parallel window, $K_W$ may denote a widthwise size of the kernel, $PW_H$ may denote a lengthwise size of the parallel window, and $K_H$ may denote a lengthwise size of the kernel.

$$AC \text{ Cycles} = \left\lceil \frac{OC}{OC_i} \right\rceil \qquad \text{[Equation 5]}$$

In Equation 5, AC Cycles may denote the number of times of outputs which indicates the number of times required to acquire the output for the value input to the PIM array 110, and $\lceil \ \rceil$ may denote a Ceil function. In addition, OC may denote the number of output channels according to the kernel, and $OC_t$ may denote a number of times a set of output values for the parallel window of a single depth (single channel) may be acquired from each column of the PIM array 110.

Thus, the controller 130 may calculate the number of times a set of output values for the parallel window of a single depth (single channel) may be acquired based on the number of columns of the PIM array 110. Thus, in the convolution computation, the number of times of outputs to the PIM array 110 according to the parallel window may be calculated.

Accordingly, the controller 130 may calculate the number of times of cycles based on at least one of the number of times of shifts, the number of times of inputs, and the number of times of outputs.

In an embodiment, the controller 130 may calculate the number of cycles through Equation 6 below.

$$N \text{ of Cycles} = N \text{ of } PWs \times AR \text{ Cycles} \times AC \text{ Cycles} \qquad \text{[Equation 6]}$$

In Equation 6, N of Cycles may denote the number of cycles, N of $PW_s$ may denote a number of times of shifts, AR Cycles may denote a number of times of inputs required for the PIM array in the row direction, and AC Cycles may denote a number of times of outputs required for the PIM array in the column direction.

Thus, the controller 130 may determine the size of the parallel window so that the number of times of cycles is minimized, and perform the computation of the convolution layer using the same.

In this connection, the size of the parallel windows is calculated by considering the widthwise and lengthwise sizes of the parallel windows, and thus may be set in various shapes and sizes.

Figure 2:
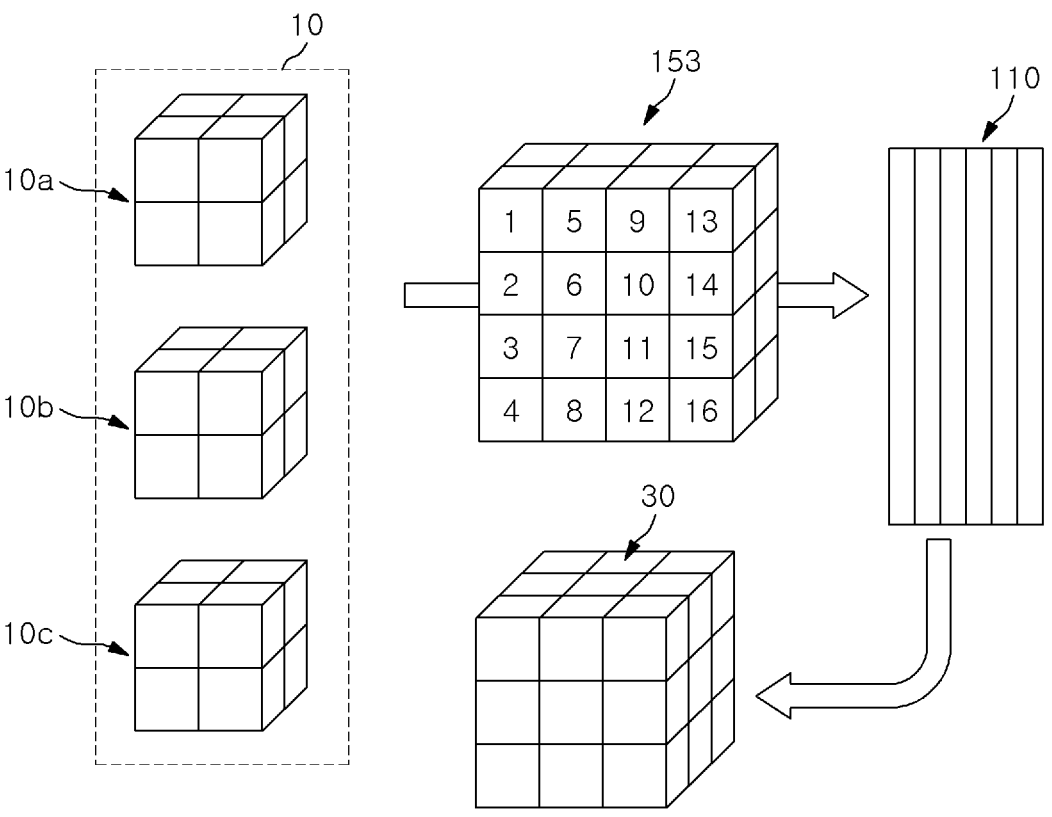
FIG. 2 is a diagram illustrating an embodiment of a computation for a convolution layer corresponding to the input data of FIG. 1.

FIG. 2 is a diagram illustrating an embodiment of a convolution computation according to a convolution layer corresponding to the input data of FIG. 1.

Referring to FIG. 2, a plurality of values filtered based on the kernel 10 among the values of the input data 153 may be input to the PIM array 110. In this connection, values filtered based on each of the kernels 10a, 10b, and 10c may be input to each column of the PIM array 110. In addition, values output from the PIM array 110 for each of the kernels 10a, 10b, and 10c may be output from each column of the PIM array 110.

In an embodiment, in one cycle of a computation of the convolution layer, when the output values (1, 2, 5, and 6) of 2 channels (2×2×2 matrix) are filtered from the input data 153 using a first kernel 10, a second kernel 10, and a third kernel 10, respectively, the controller 130 may input the filtered values into the eight rows of the PIM array 110. Accordingly, the PIM array 110 may acquire output values through three columns. Thus, the controller 130 may acquire output data 30 through nine cycles.

Figure 3:
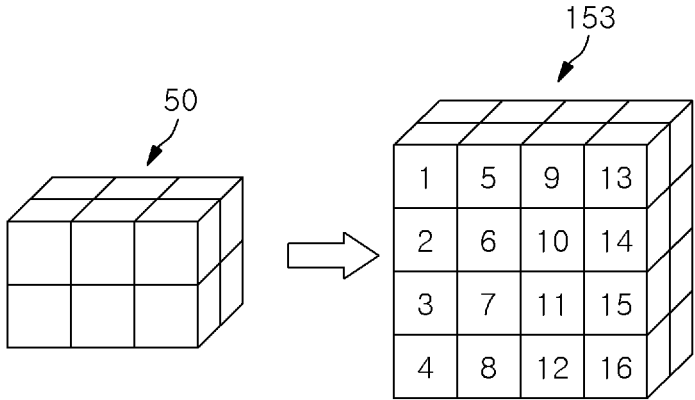
FIG. 3 is a diagram illustrating an embodiment of the input data of FIG. 1 and a parallel window determined by a controller.

FIG. 3 is a diagram illustrating an embodiment of the input data of FIG. 1 and a parallel window determined by a controller.

Referring to FIGS. 2 and 3, the size of the parallel window 50 may be set within a range equal to or greater than the size of the kernel 10 and equal to or smaller than the size of the input data 153. In an embodiment, when the size of the parallel window 50 is 2×3×2, the controller 130 may filter 6 values from each channel of the input data 153 per cycle.

In this connection, the controller 130 may acquire the output data 30 through six cycles.

Figure 4:
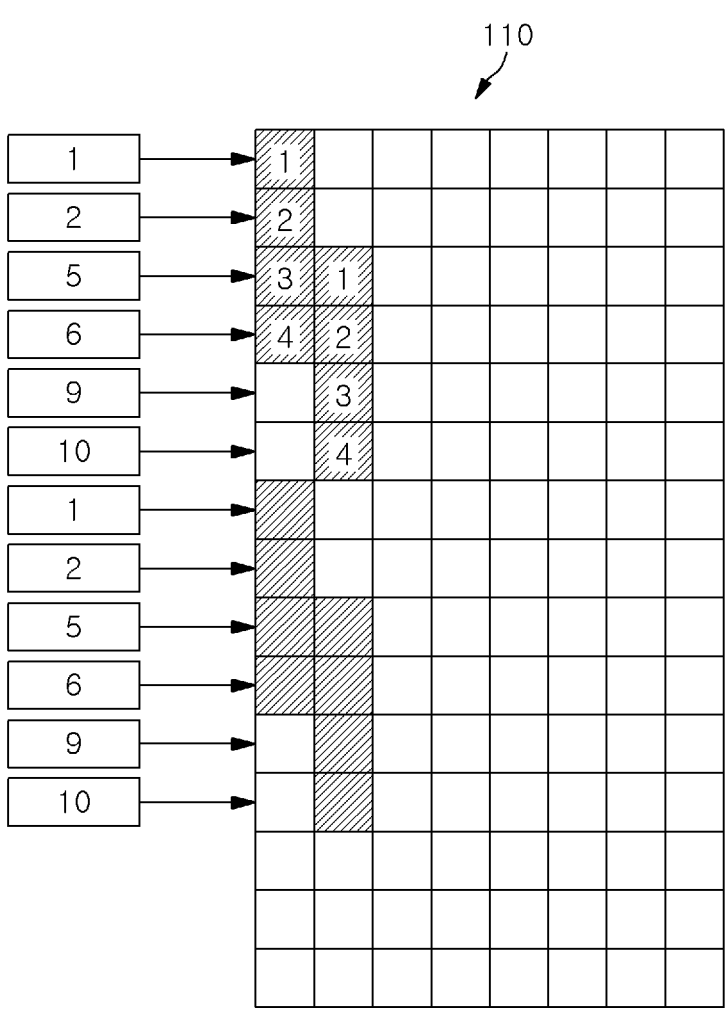
FIGS. 4 and 5 are diagrams illustrating an embodiment of a process in which a PIM array is used based on a parallel window determined by the controller of FIG. 1.
Figure 5:
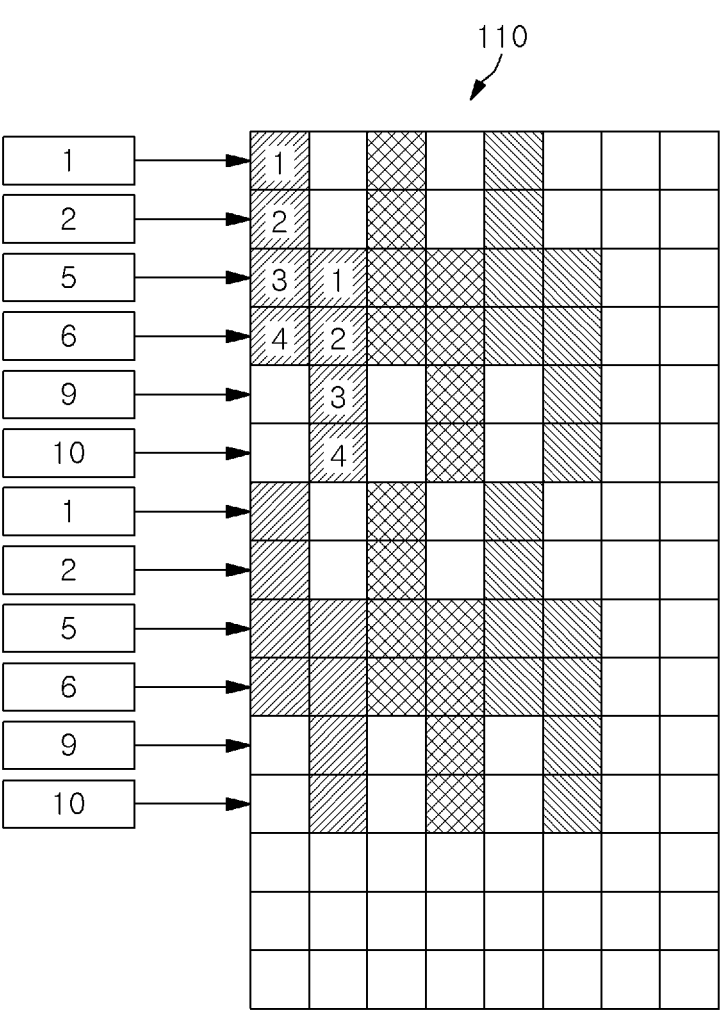

FIGS. 4 and 5 are diagrams illustrating an embodiment of a process in which a PIM array is used based on a parallel window determined by the controller of FIG. 1.

Referring to FIGS. 2 to 4, it may be identified that the values of two channels of six (1, 2, 5, 6, 9, and 10) filtered from the input data 153 through the parallel window 50 are input to each row of the PIM array 110.

In addition, in each column of the PIM array 110, it may be identified that the output data 30 is generated based on the value filtered through the parallel window 50. In this connection, weights according to each of the kernels 10a, 10b, and 10c may be set for each sub-array 1, 2, 3, and 4 of the PIM array 110. Accordingly, the controller 130 may acquire an output value using only values to be filtered through each of the kernels 10a, 10b, and 10c among a plurality of values filtered through the parallel window 50.

Thus, the controller 130 may acquire two output values per cycle. This may correspond to a value acquired through two cycles in the case of using the kernel 10.

Referring further to FIG. 5, it may be identified that the values of each sub-array are set to correspond to each of the kernels 10a, 10b, and 10c.

Thus, the controller 130 may acquire six output values for each cycle using the parallel window 50. This may correspond to a value acquired through two cycles in the case of using each of the kernels 10a, 10b, and 10c.

Figure 6:
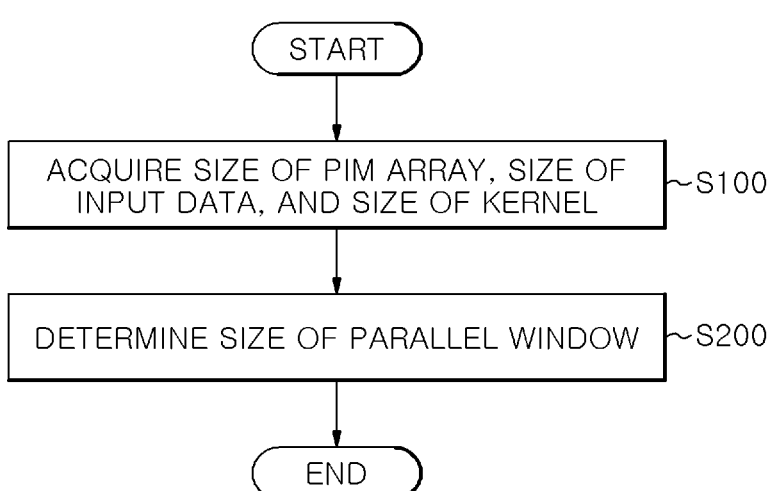
FIG. 6 is a flowchart of a method of controlling a memory device according to an embodiment of the present disclosure.

FIG. 6 is a flowchart of a method of controlling a memory device according to an embodiment of the present disclosure.

Referring to FIG. 6, the controller 130 may acquire the size of the PIM array 110 prepared to compute the convolution layer included in the deep neural network 151, the size of input data 153 input to the convolution layer, and the size of the kernel 10 filtering the input data 153 (S100).

Accordingly, the controller 130 may determine the size of the parallel window 50 based on the size of the PIM array 110, the size of the input data 153, and the size of the kernel 10 such that the number of times of cycles of the PIM array 110 for the convolutional layer is minimized (S200).

Thus, the controller 130 may perform the computation of the convolution layer based on the parallel window 50 whose size is determined.

Figure 7:
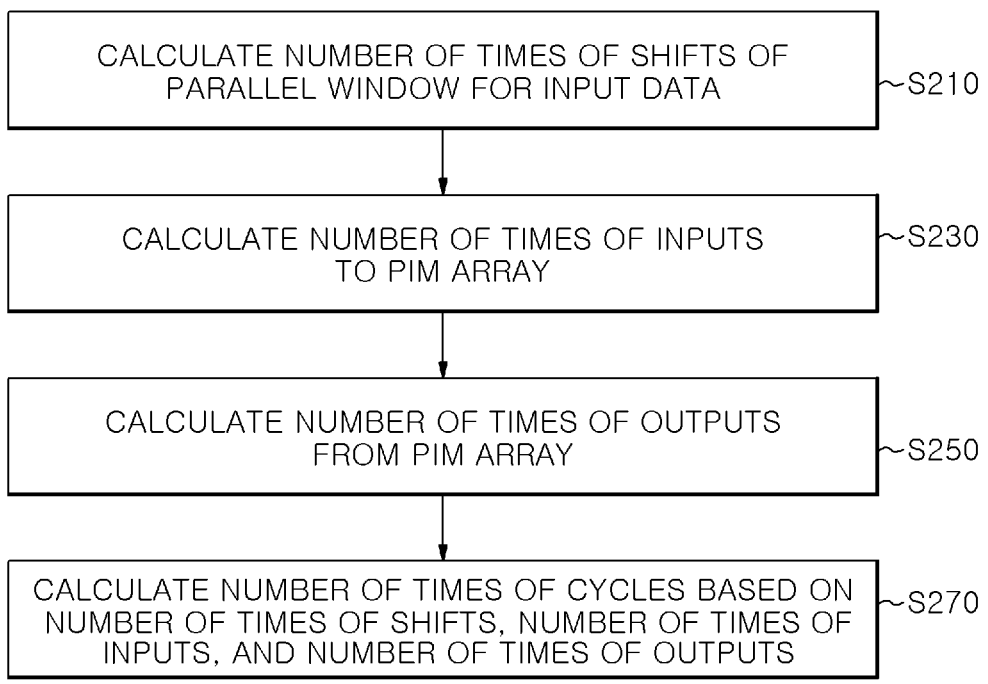
FIG. 7 is a detailed flowchart of determining the size of the parallel window of FIG. 6.

FIG. 7 is a detailed flowchart of determining the size of the parallel window of FIG. 6.

Referring to FIG. 7, the controller 130 may calculate the number of times of shifts of the parallel window 50 for the input data 153 based on the size of the PIM array 110, the size of the input data 153, and the size of the kernel 10 (S210).

In addition, the controller 130 may calculate the number of times of inputs to the PIM array 110 according to the size of the parallel window 50 based on the size of the PIM array 110, the size of the input data 153, and the size of the kernel 10 (S230).

In addition, the controller 130 may calculate the number of times of outputs from the PIM array 110 according to the size of the parallel window 50 based on the size of the PIM array 110, the size of the input data 153, and the size of the kernel 10 (S250).

Accordingly, the controller 130 may calculate the number of times of cycles based on at least one of the number of times of shifts, the number of times of inputs, and the number of times of outputs (S270).

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart. In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A method performed by a controller included in a memory device, the method comprising:
acquiring a size of a PIM array provided to compute a convolution layer included in a deep neural network, a size of input data input to the convolution layer, and a size of a kernel filtering the input data; and
determining a size of a parallel window such that a number of times of cycles of the PIM array for the convolution layer is minimized based on the size of the PIM array, the size of the input data, and the size of the kernel,
wherein the determining the size of the parallel window includes:
calculating the number of times of cycles based on at least one of a number of times of shifts of the parallel window for the input data, a number of times of inputs to the PIM array according to the size of the parallel window, and a number of times of outputs outputted from the PIM array according to the size of the parallel window.

2. The method of claim 1, wherein
the number of times of shifts are calculated based on the size of the PIM array, the size of the input data, and the size of the kernel,
the number of times of inputs are calculated based on the size of the PIM array, the size of the input data, and the size of the kernel; and
the number of times of outputs are calculated based on the size of the PIM array, the size of the input data, and the size of the kernel.

3. The method of claim 2, wherein the calculating of the number of times of shifts is configured to calculate the number of times of shifts based on at least one of the size of the input data and the size of the kernel.

4. The method of claim 2, wherein the calculating of the number of times of inputs is configured to calculate the number of times of inputs based on at least one of the size of the PIM array, the size of the input data, and the number of input channels according to the input data.

5. The method of claim 2, wherein the calculating of the number of times of outputs is configured to calculate the number of times of outputs based on at least one of the size of the PIM array, the size of the input data, the size of the kernel, and the number of output channels according to the kernel.

6. A memory device, comprising:
a PIM array configured to compute a convolution layer included in a deep neural network; and
a controller configured to acquire a size of the PIM array, a size of input data input to the convolution layer, and a size of a kernel filtering the input data, determine a size of a parallel window such that a number of times of cycles of the PIM array for the convolution layer is minimized based on the size of the PIM array, the size of the input data, and the size of the kernel, and calculate the number of times of cycles based on at least one of a number of times of shifts of the parallel window for the input data, a number of times of inputs to the PIM array according to the size of the parallel window, and a number of times of outputs outputted from the PIM array according to the size of the parallel window.

7. The memory device of claim 6, wherein
the number of times of shifts are calculated based on the size of the PIM array, the size of the input data, and the size of the kernel;
the number of times of inputs are calculated based on the size of the PIM array, the size of the input data, and the size of the kernel; and
the number of times of outputs are calculated based on the size of the PIM array, the size of the input data, and the size of the kernel.

8. The memory device of claim 7, wherein the controller is configured to calculate the number of times of inputs based on at least one of the size of the PIM array, the size of the input data, and the number of input channels according to the input data.

9. The memory device of claim 7, wherein the controller is configured to calculate the number of times of outputs based on at least one of the size of the PIM array, the size of the input data, the size of the kernel, and the number of output channels according to the kernel.

10. The memory device of claim 6, wherein the controller is configured to calculate the number of times of shifts based on at least one of the size of the input data and the size of the kernel.

11. A non-transitory computer-readable storage medium including computer executable instructions, wherein the instructions, when executed by a processor, cause the processor to perform a method of controlling a memory device, the method comprising:
acquiring a size of a PIM array provided to compute a convolution layer included in a deep neural network, a size of input data input to the convolution layer, and a size of a kernel filtering the input data; and
determining a size of a parallel window such that a number of times of cycles of the PIM array for the convolution layer is minimized based on the size of the PIM array, the size of the input data, and the size of the kernel, wherein the determining the size of the parallel window includes:

calculating the number of times of cycles based on at least one of a number of times of shifts of the parallel window for the input data, a number of times of inputs to the PIM array according to the size of the parallel window, and a number of times of outputs outputted from the PIM array according to the size of the parallel window.

12. The non-transitory computer-readable storage medium of claim 11, wherein the number of times of shifts are calculated based on the size of the PIM array, the size of the input data, and the size of the kernel, the number of times of inputs are calculated based on the size of the PIM array, the size of the input data, and the size of the kernel, and the number of times of outputs are calculated based on the size of the PIM array, the size of the input data, and the size of the kernel.

13. The non-transitory computer-readable storage medium of claim 12, wherein the calculating of the number of times of shifts is configured to calculate the number of times of shifts based on at least one of the size of the input data and the size of the kernel.

14. The non-transitory computer-readable storage medium of claim 12, wherein the calculating of the number of times of inputs is configured to calculate the number of times of inputs based on at least one of the size of the PIM array, the size of the input data, and the number of input channels according to the input data.

15. The non-transitory computer-readable storage medium of claim 12, wherein the calculating of the number of times of outputs is configured to calculate the number of times of outputs based on at least one of the size of the PIM array, the size of the input data, the size of the kernel, and the number of output channels according to the kernel.

* * * * *